United States Patent [19]

Jolly

[11] 4,237,744
[45] Dec. 9, 1980

[54] CHAIN TENSIONING SYSTEM FOR VEHICLES

[76] Inventor: James D. Jolly, Rte. 2, Glen Dean, Ky. 40141

[21] Appl. No.: 962,105

[22] Filed: Nov. 20, 1978

[51] Int. Cl.³ ............................................. F16H 7/10
[52] U.S. Cl. ............................ 474/116; 74/242.14 B; 474/112; 180/72
[58] Field of Search ....... 74/242.12, 242.16, 242.14 R, 74/242.14 B, 242.15 R, 242.15 B, 242.11 B, 13 R, 13 A; 180/32, 72; 280/285

[56] References Cited

U.S. PATENT DOCUMENTS

| | | | |
|---|---|---|---|
| 1,141,539 | 6/1915 | Greer et al. | 74/242.16 |
| 1,700,631 | 1/1929 | Festini | 74/242.15 B |
| 2,691,553 | 10/1954 | Pettigrew | 74/242.16 |

FOREIGN PATENT DOCUMENTS 473771  10/1914  France .................................. 74/242.16

Primary Examiner—C. J. Husar
Assistant Examiner—Conrad Berman
Attorney, Agent, or Firm—John E. Benoit

[57] ABSTRACT

A wheeled vehicle is described having a drive sprocket bound onto the axle fixed to the vehicle and a driven wheel with a sprocket on its axle, with the driven chain connecting the sprocket for transmitting power from the drive sprocket to the driven sprocket. The invention comprises a chain tension adjusting device having a means for mounting the driven wheel axle for limited movement thereof toward and away from said drive sprocket axle, a fork frame having its legs rotatably mounted on the driven wheel axle on either side of the said driven sprocket and terminating at its closed end in at least one sleeve, with camming means mounted within said sleeve, and means for manually rotating said camming means within said sleeve so as to move said driven wheel axle by means of the fork frame toward and away from said drive sprocket axle. Additionally, there may be provided a means for adjusting the position of the shock-spring elements at the rear of the vehicle so as to vary the relationship of the axis of the shock-spring relative to the axle of the driven wheel so that the tension of the chain is varied as changing conditions occur while riding the bike. Such a tension may also be adjusted in accordance with the weight of the rider.

7 Claims, 12 Drawing Figures

U.S. Patent   Dec. 9, 1980   Sheet 1 of 3   4,237,744
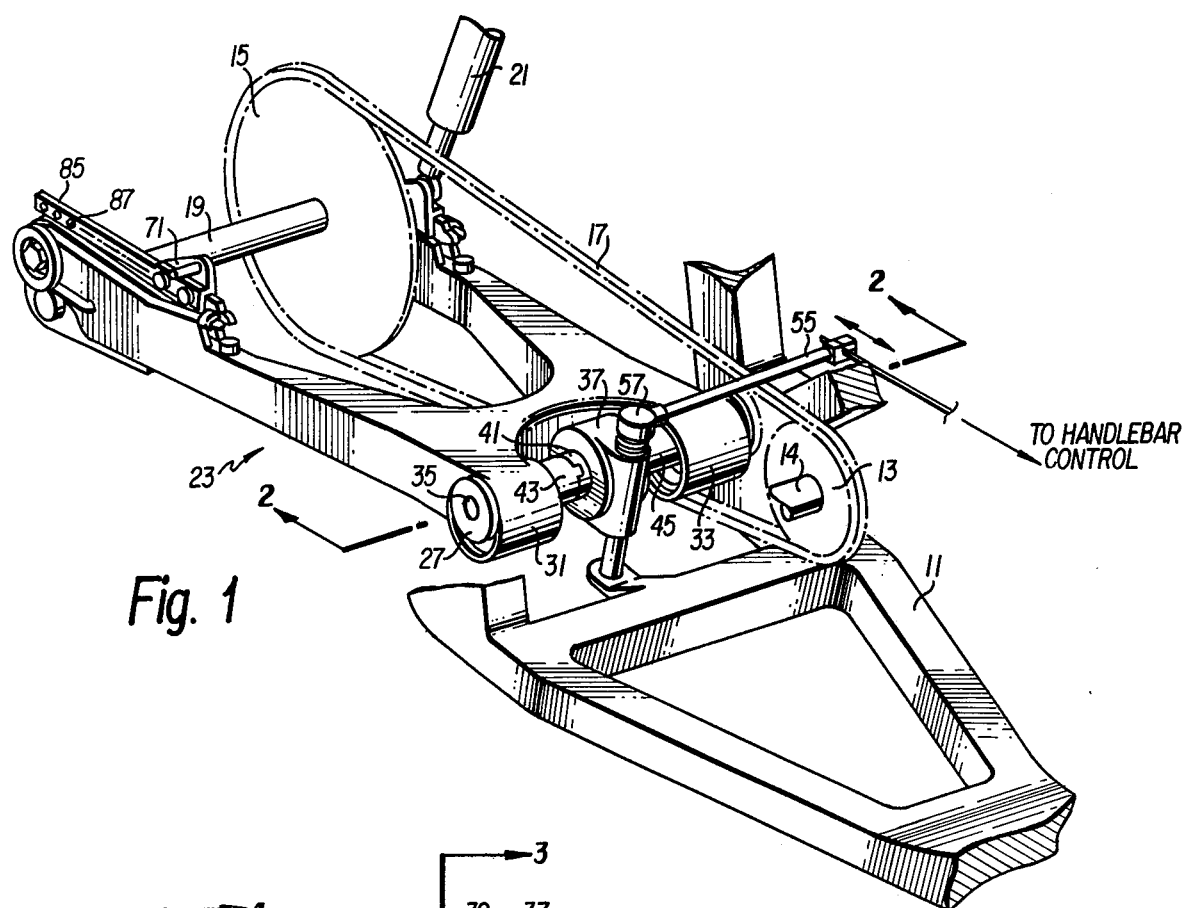
Fig. 1
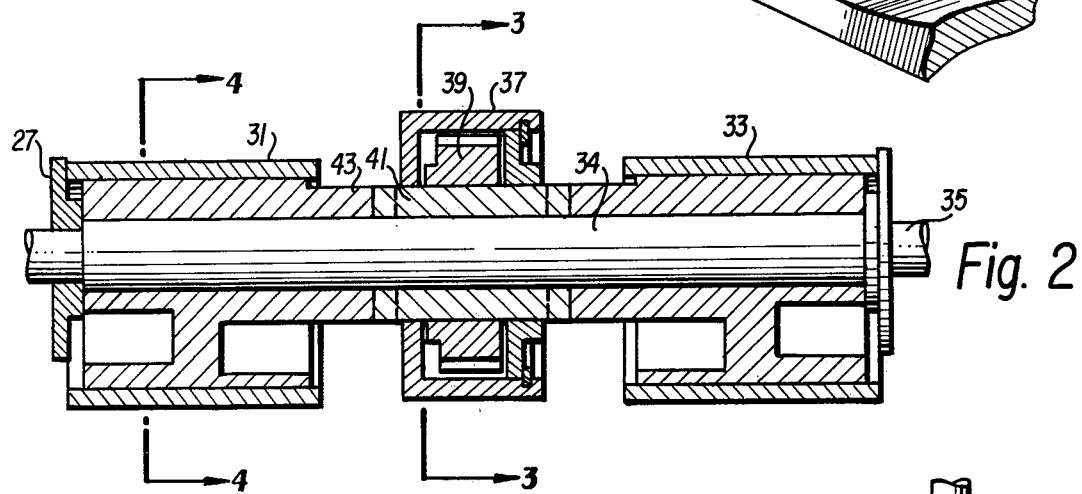
Fig. 2
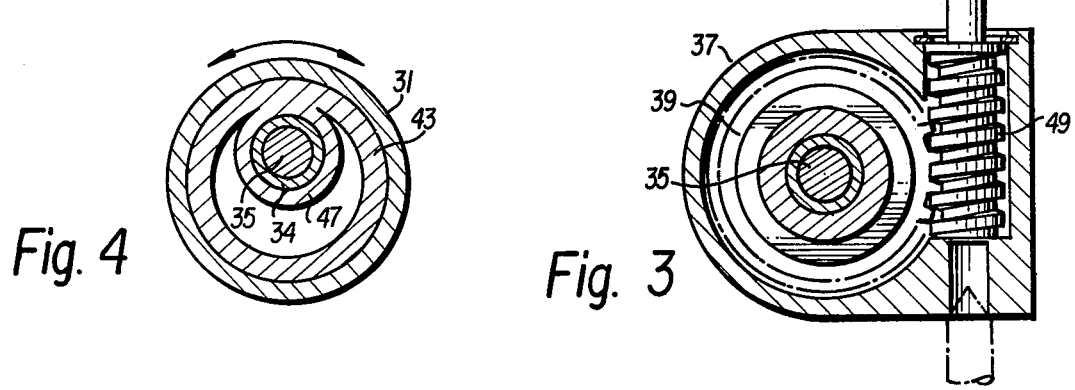
Fig. 4
Fig. 3

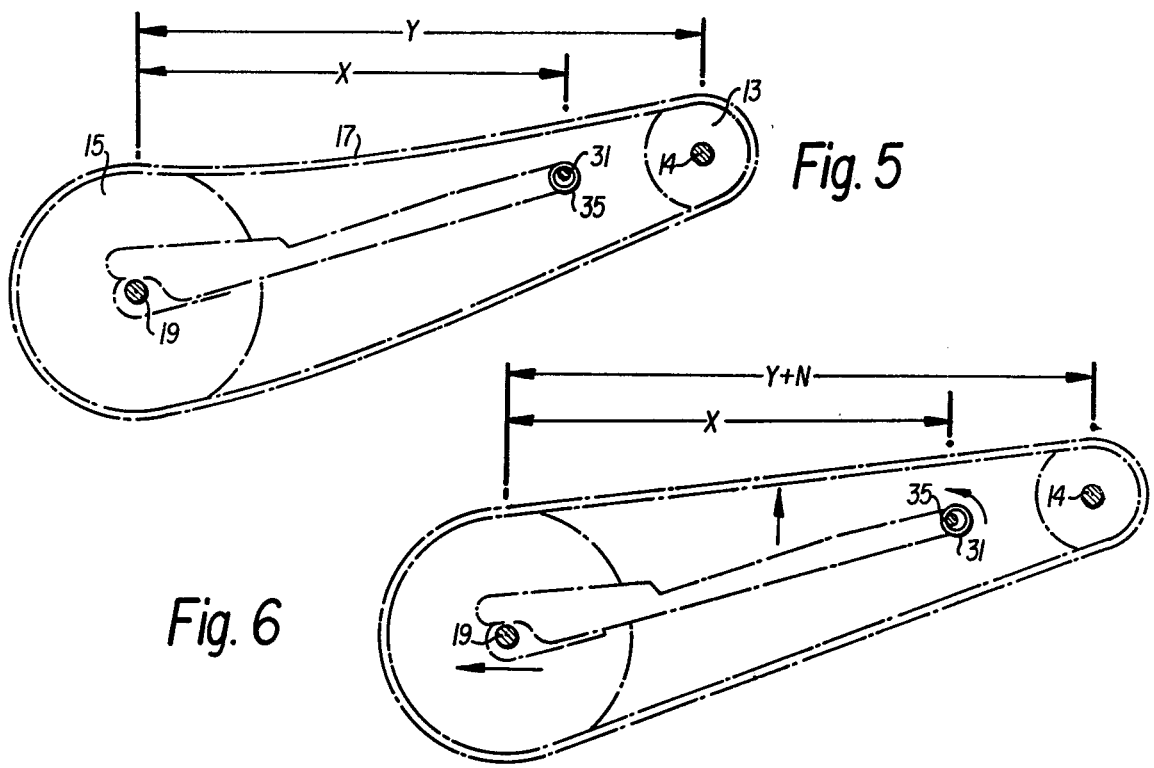
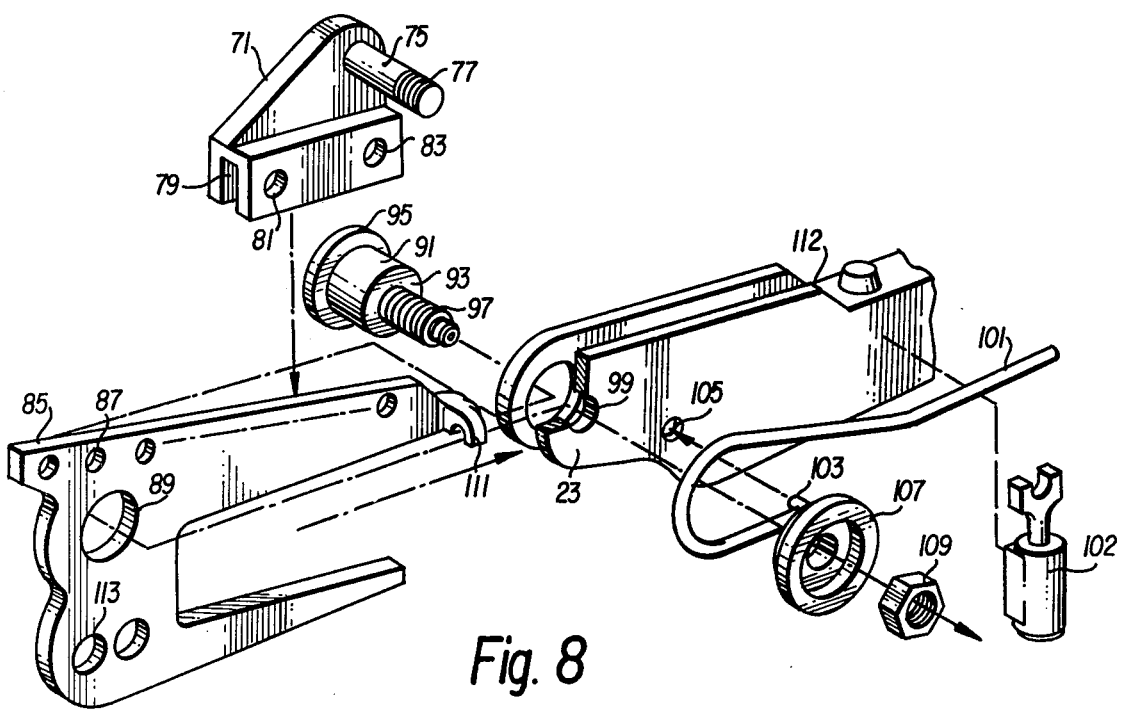

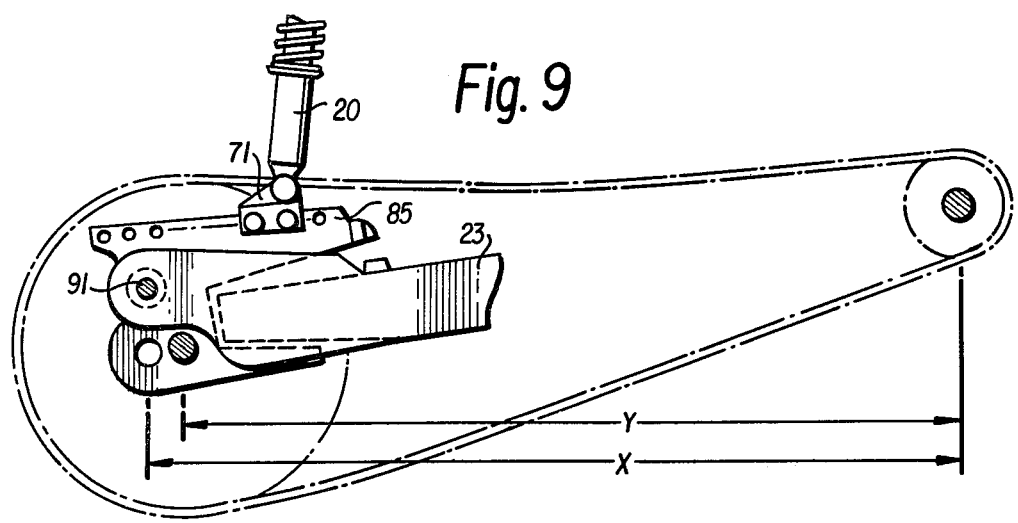
Fig. 9
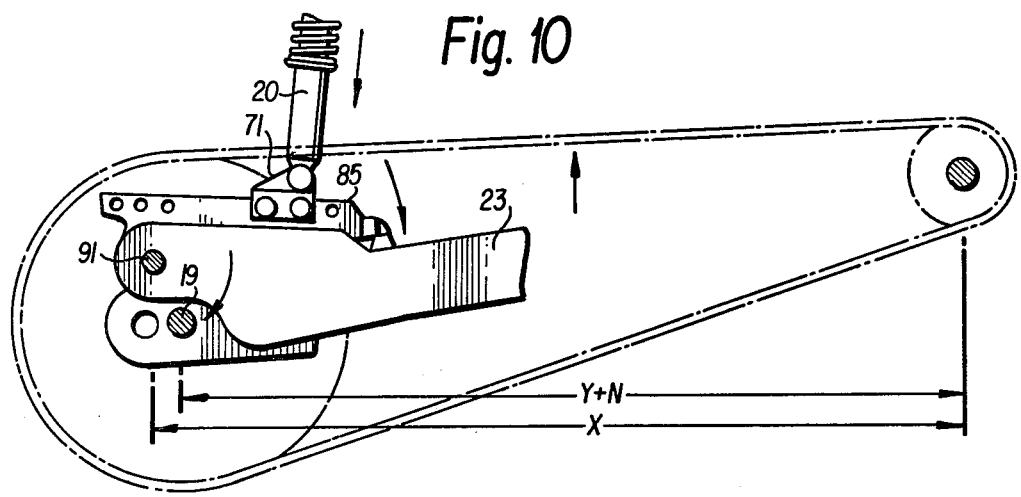
Fig. 10
Fig. 7
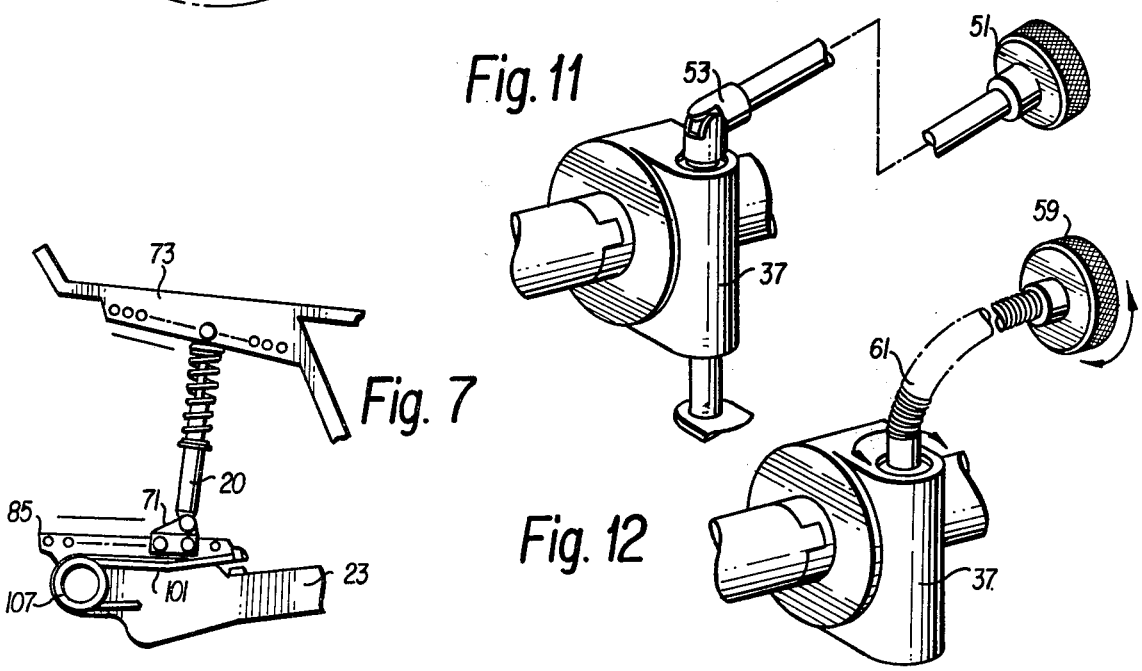
Fig. 11
Fig. 12

CHAIN TENSIONING SYSTEM FOR VEHICLES

The invention relates broadly to the tension applied to chains in a two wheel driven bike and more specifically to means for adjusting the tension manually while the bike is in operation. The invention further includes means for adjusting the bike for drivers of different weights.

BACKGROUND OF THE INVENTION

Present type motorcycle rear suspension has the rear wheel vertical travel pivot point located between the engine sprocket and the rear wheel driven sprocket which results in varying drive chain tension as the wheel moves substantially vertically about the pivot point. This variation and drive chain tension causes shock loading of the drive chain in excess of the working load due to the horsepower transmitted to the rear, driven wheel in the form of shock loads which, in some situations, results in premature chain failure due to fatigue or tensile breakage. In modern bikes, the situation which exists for on-road type usage becomes quite severe in off-road usage. Even the average bike ridden a very short distance will cause stretching of the chain as an addition to wear and should be adjusted at least every day. Dirt bikes have very rough treatment due to the dirt soil and need to be adjusted about every thirty minutes.

Accordingly, the ideal situation would be to adjust the chain tension when the bike is to be used for any particular type of travel. However, present day bikes require considerable mechanical adjustments and time consuming effort in order to change the tension of the chain drive. Such a change usually requires removal of certain pieces of equipment, subsequent movement of the rear wheel axle and replacement of the equipment. Under present known conditions, it is not really feasible to be constantly changing the tension that exists on the chain of the bike.

Accordingly, it is an object of the invention to provide a simplified mechanism which varies the distance between the axle of the driven socket and the axle of the drive socket, which in turn adjusts the tension of the chain.

A further object of this invention is to provide means which may be manually operated while the bike is in use which will adjust the tension of the chain.

A further object of this invention is to provide a camming means which will effectively change the distance between the axle of the driven sprocket and the axle of the drive sprocket, such camming means being manually adjustable while the bike is in operation.

A further object of the invention is to provide a means whereby the shock-spring element at the rear of the vehicle may be adjustable in relation to the rider's weight so as to vary the axis of the shock-spring in relation to the axle of the driven wheel. This variation, in turn, causes movement of the axle so as to vary the tension of the spring under changing riding conditions as they occur.

A further object of this invention is to provide the advantage of maintaining alignment during adjustment of the tension as is normally the case when the chain tension must be adjusted under standard practice.

SUMMARY OF THE INVENTION

The invention is used in a wheeled vehicle having a drive sprocket bound onto the axle fixed to the vehicle and a driven wheel with a sprocket on its axle, with the drive chain connecting the sprocket for transmitting power from the drive sprocket to the driven sprocket. The invention comprises a chain tension adjusting device having a means for mounting the driven wheel axle for limited movement thereof toward and away from said drive sprocket axle, a fork frame having its legs rotatably mounted on the driven wheel axle on either side of the said driven sprocket and terminating at its closed end in at least one sleeve, with camming means mounted within said sleeve, and means for manually rotating said camming means within said sleeve so as to move said driven wheel axle by means of the fork frame toward and away from said drive sprocket axle. Additionally, there may be provided a means for adjusting the position of the shock-spring elements at the rear of the vehicle so as to vary the relationship of the axis of the shock-spring relative to the axle of the driven wheel so that the tension of the chain is varied as changing conditions occur while riding the bike. Such a tension may also be adjusted in accordance with the weight of the rider.

BRIEF DESCRIPTION OF THE DRAWINGS

FIG. 1 is a perspective view showing a partially broken away section of the frame and the rear suspension together with the adjusting mechanism of the present invention;

FIG. 2 is a sectional view taken through lines 2—2 of FIG. 1;

FIG. 3 is a sectional view taken along the lines 3—3 of FIG. 2;

FIG. 4 is a sectional view taken along the lines 4—4 of FIG. 2;

FIG. 5 is a schematic view of the chain and sprockets in one position;

FIG. 6 is a schematic view showing the chain and sprockets in an adjusted position;

FIG. 7 is a schematic illustration of the relationship of the shock-spring element with respect to the rear axle and the adjustability of the position of the shock-spring;

FIG. 8 is an exploded view of the structure used to provide the illustrated usage of FIG. 7;

FIGS. 9 and 10 are schematic illustrations showing the effect of the pressures applied downwardly on the shock-spring mechanism of FIGS. 7 and 8; and FIGS. 11 and 12 show alternate mechanisms which may be used with the mechanism illustrated in FIGS. 1–4.

DETAILED DESCRIPTION OF A PREFERRED EMBODIMENT OF THE INVENTION

Turning now more specifically to the drawings and referring particularly to FIGS. 1 through 4, there is shown a partial view of a vehicle having a forward frame 11 with a drive sprocket 13 mounted thereto by a shaft 14 which, in turn, is driven by means such as a motor (not shown). The drive sprocket 13 is connected to a driven sprocket 15 by means of an endless chain 17. Shaft 19 is connected to the rear for driving purposes. The shaft 19 is mounted to the main vehicle frame by means of a shock-spring assembly 21.

A forked swing arm 23 is mounted with its two arms straddling the driven sprocket 15 and mounted for rotation about shaft 19. The forward end of the forked swing arm 23 terminates in two sleeves 31 and 33. A shaft 35 extends through the two sleeves and is mounted to the forward frame 11. Substantially centrally located on said shaft is a housing 37 which contains therein a tooth gear 39, FIGS. 2 through 4, which is keyed to a cylinder 41 which is mounted on shaft 35.

Two opposing cams 43 and 45 are mounted to cylinder 41 by means of a tongue and groove arrangement or the like. The configuration of the particular cam is illustrated in FIG. 4. As will be obvious, the shaft 35 has its axis offset from the axis of the sleeves 31 and 33. The particular configuration of the cam 43 is designed so as to effectively reduce the weight thereof. A bearing sleeve 34 is mounted between sleeve 47, which is an integral part of cam 43, and shaft 35.

As can be seen in FIG. 3, a worm 49 drives the gear 39 so as to rotate it together with cylinder 41 and, thus, the cams 43 and 45. Worm 49 may be driven externally by any manual means. One such means is shown in FIG. 1 as being spring return ratchet 57 which drives worm 49. This in turn controls the rotation of the cylinder 39 in either a clockwise or counterclockwise direction. Such an arrangement allows the use of a flexible cable extending to the handle bar (not shown) to make the adjustment with the spring return on the ratchet returning it to the original position.

The main concern is the tightening of the chain while the bike is in motion since the only thing that the rider will want to do is to compensate for the wear of the chain. Normally, if he wants to loosen the chain for any reason, he would do it when the bike is not moving.

FIGS. 5 and 6 show the intended operation of this specific aspect of the invention. In FIG. 5 it will be seen that there is a constant distance X between the axis of the shaft 35 and the axis of the shaft 19. The showing in FIG. 5 indicates that there is some slack in the chain 17 due to the existing distance between drive shaft 14 and driven shaft 19. The distance between the shafts 35 and 19 is designated as X and the distance between shaft 14 and 19 is designated as Y.

In order to tighten or adjust the tension of the chain 17, camming means 43 and 47 are rotated by the turning of shaft 50 including worm 49 so as to effectively move cams 43 and 47 eccentrically about axle 35 and, thus, against sleeve 31, forcing the forked swing arm 23 rearwardly. This moves axle 19 a predetermined distance which effectively increases the tension on the chain.

FIGS. 11 and 12 illustrate other mechanisms which may be used to operate the cams. FIG. 11 uses a rod having a knob 51 which may be oscillated to operate a ratchet mechanism 53. FIG. 11 shows the use of rotatable knob 59 and flexible cable 61 which operates a worm such as illustrated in FIG. 3.

Referring now to FIG. 7 and the corresponding showing of FIG. 1, there is illustrated a plate 71 which is rotatably secured to the lower end of shock-spring element 20. The other end of shock-spring element 20 is fastened to the under side of the frame below the seat section of the vehicle. FIG. 8 discloses the details of this particular plate 71 wherein it includes a channel 79 with bore holes 81 and 83 passing through either side of channel 79. Also included is a bolt 75 extending outwardly from the upper portion of plate 71 and terminating in threaded portion 77 for reasons which will become obvious as the description proceeds.

The mechanism further includes a U-shaped plate 85 having a plurality of adjustment bore holes 87 which are of a geometrical configuration and spacing such that they are designed to meet in alternate pairs with the bore holes 81 and 83 of plate 71.

A bearing shaft 91 having a terminating shoulder 93 passes through a bore hole 89 in the U-shaped plate 85 so that the face 93 abuts against the inner face of one of the legs of the forked swing arm 23. Threaded portion 97 continues on through a smaller bore hole 99 in swing arm 23 and a spring member 101. The spring member is pressed tightly against the outer face of swing arm and is held in place by means of a retaining ring 107 and a nut 109.

The upper arm of the U-shaped plate 85 terminates at its outer end in a finger 111 which, as can be seen in FIG. 1, passes beyond the shoulders 112 of the swing arm 23 and extends outwardly perpendicularly to the arm.

Finger 111 retains the outer end of spring 101 so as to cause the spring to exert a force upwardly against finger 111.

Rear axle 19 passes through either of the selected bore holes 113 depending upon the weight of the rider using the vehicle during a particular riding condition. This same equipment shown in FIGS. 7 and 8 is also provided on the opposite side of the forked swing arm as generally indicated in FIG. 1.

The operation of the device under different conditions is shown in FIGS. 9 and 10. FIG. 9 shows the condition of the bike and chain with no pressure being put upon the shock-spring element 20, therefore exerting no pressure on plate 71. However, with pressure being exerted by the rider downwardly on the seat of the vehicle as indicated in FIG. 9, the shock-spring element 20 exerts downward force on plate 71 which, in turn, presents a downward force on the forward part of U-shaped plate 85. U-shape plate 85 is secured to the rear axle 19 of the driven wheel and is biased upwardly by means of the spring 101. The distance X between bearing shaft 91 and the driving axle remains constant as indicated in FIGS. 9 and 10. Thus, it can be seen that downward pressure on the shock-spring element 20 rotates plate 85 about bearing shaft 91. Since axle 19 passes through one of the bore holes 113, rotation of plate 85 clockwise as shown by the arrows will force axle 19 rearwardly in the direction shown by the arrows thus tightening the chain when such pressure is exerted on the shock-spring element 20. The amount of tightening will depend upon the difference in distance X between the driven sprocket shaft 14 and the bearing shaft 91 and the distance Y between the driven sprocket shaft 14 and the axle 19 of the driven wheel.

It will be obvious that this effect can be altered by altering the position of the shock-spring 20 relative to the holes along both the plate 85 and the frame 73 as indicated by the arrows in FIG. 7. The further away the axis of the shock-spring is mounted from the axis of the axle 19, the greater the moment, and thus the torque exerted on the axle. This torque is directly related to the distance the axle will move as a result of the force. The dual bore holes 113 in the U-shaped plate 85 also provides a means for adjusting for the weight of the driver. When axle 19 is in the forward bore hole, it is nearest to the plane of the axis of the pivot point of the entire mechanism. In this position, more force is required to obtain movement of the device. However, if a lighter person is riding the bike, then axle 19 would be placed in the rear bore hole which would substantially increase the distance to the plane of the axis. Accordingly, less weight is required of the pivot point in order to make the apparatus function as desired. It is also obvious that if the shock-spring is placed directly over the axle 19, there will be no moment and thus no rotation of the plate 85 and no movement of the axle 19.

The action of spring 101 (FIG. 8) is shown as being supplemented by a small shock absorber. This shock absorber, if of sufficient capacity, may be used by itself without the need of a spring. The obvious relationship to finger 111 is not considered to require a separate drawing.

The above description and drawings are illustrative only since known components may be substituted for those shown and described. Accordingly, the invention is to be limited only by the scope of the following claims.

I claim:

1. In a wheeled vehicle having a drive sprocket mounted on an axle fixed to said vehicle, a driven wheel with a sprocket on its axle, and a drive chain connecting said sprockets for transmitting power from said drive sprocket to said driven sprocket, a chain tension adjusting device comprising
    means for mounting said driven wheel on an axle mounted to said driven sprocket;
    a forked frame having its legs rotatably mounted on a shaft parallel to and secured to said driven wheel axle on either side of said driven sprocket and terminating at its closed end in at least one sleeve;
    means for rotatably mounting said sleeve to said frame;
    camming means mounted within said sleeve; and
    means for manually rotating said camming means within said sleeve so as to move said driven wheel axle by means of said forked frame toward and away from said drive sprocket axle.

2. The wheeled vehicle of claim 1 wherein said means for manually rotating said camming means within said sleeve comprises
    a circular toothed gear mounted on said camming means;
    a worm gear mating with said circular tooth gear; and
    an external shaft for manually rotating said worm gear.

3. The wheeled vehicle of claim 2 further comprising a ratchet coupled between said external shaft and said worm gear.

4. The wheeled vehicle of claim 3 wherein said ratchet is spring loaded.

5. The wheeled vehicle of claim 1 further comprising
    plate means rotatably mounted between said axle of said driven wheel and said shaft;
    a shock-spring assembly;
    means for adjustably mounting one end of said shock-spring assembly to said plate means; and
    means for adjustably mounting the other end of said shock-spring assembly to the frame of said vehicle above said plate whereby the axis of said shock-spring may be offset relative to the axis of said driven wheel when pressure is applied on said shock-spring.

6. In a wheeled vehicle having a drive sprocket mounted on an axle fixed to said vehicle, a driven wheel with a sprocket on its axle and a drive chain connecting said drive wheel sprocket to said driven sprocket, a chain tension device comprising
    a forked frame having its legs rotatably mounted on a shaft parallel to the axle of said driven sprocket and terminating at its closed end in at least one sleeve;
    means for rotatably mounting said sleeve to said frame;
    plate means rotatably mounted between said axle of said driven wheel and said shaft;
    a shock-spring assembly;
    means for adjustably mounting one end of said shock-spring assembly to said plate means; and
    means for adjustably mounting the other end of said shock-spring assembly to the frame of said vehicle above said plate whereby the axis of said shock-spring may be offset relative to the axis of said driven wheel when pressure is applied on said shock-spring.

7. The wheeled vehicle of claim 6 further comprising means for adjusting the position of said shaft parallel to the axle of said driven socket relative to the axis of said driven socket.

* * * * *